A. VAN BIBBER.
Billiard-Table.

No. 226,212. Patented April 6, 1880.

Witnesses:
Charles Tucker

Inventor:
Andrew Van Bibber
By A. H. Ellsworth
His Attorney.

UNITED STATES PATENT OFFICE.

ANDREW VAN BIBBER, OF CINCINNATI, OHIO.

BILLIARD-TABLE.

SPECIFICATION forming part of Letters Patent No. 226,212, dated April 6, 1880.

Application filed December 9, 1879.

*To all whom it may concern:*

Be it known that I, ANDREW VAN BIBBER, of Cincinnati, in the county of Hamilton and State of Ohio, have invented certain new and useful Improvements in Billiard-Tables; and I do hereby declare the following to be a full, clear, concise, and exact description of the same, sufficient to enable those skilled in the art to make and use it, reference being had to the accompanying drawings, forming part of this specification, wherein—

Figure 1:
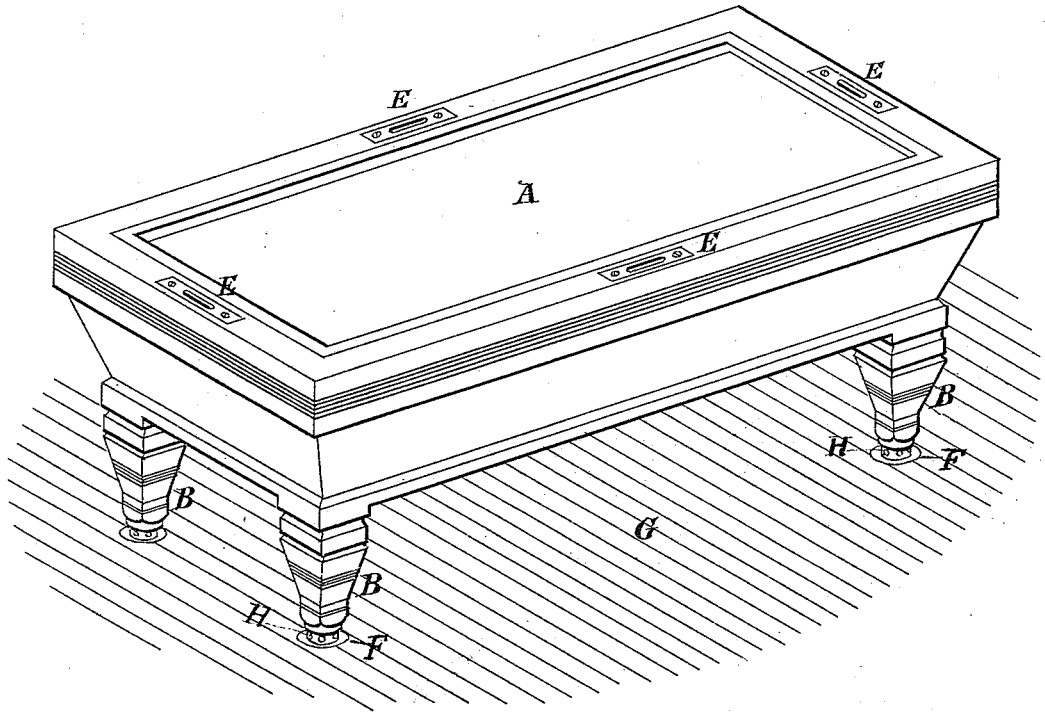
Figure 2:
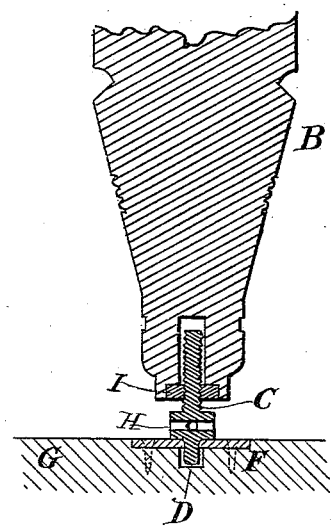

Figure 1 is a perspective view of a billiard-table, showing the application of my improvements; and Fig. 2 is a sectional view of one of the table-legs and its adjusting device.

Similar letters of reference in the accompanying drawings indicate the same parts.

My invention is designed to remedy the difficulty at present experienced in leveling the surface of billiard-tables; and to this end it consists in providing each leg of the table with a screw, and a nut for the same, such screw carrying a projection to enter a plate set in the floor of the room where the table is located, as I will now proceed to describe.

In the accompanying drawings, A represents an ordinary billiard-table, and B its legs. Each leg is bored out from the lower end for a short distance, to receive a screw, C, having an enlarged head, which is provided with a series of recesses or holes to receive the end of a suitable instrument for turning the screw. The screw works through a nut, I, set into the end of the leg, and its head H carries an extension or projection, D, to enter a hole in and pass through a metal plate, F, secured to the floor G of the room where the table is placed. The shoulders upon the heads of the screws bear upon the plates to support the table and form bearings for turning the screws, while the points D, which are unsupported by the plates vertically, prevent the table from being displaced laterally.

To adjust the height and level the table it is only necessary to turn one or more of the screws by means of an instrument inserted in the recesses of the screw-head H.

For the purpose of determining the proper level of the table when set or adjusted, the rails, sides, or other parts may be provided with a series of spirit-levels, E, as shown in the drawings.

Having thus described my invention, what I claim is—

The combination, with the legs of a billiard-table, of the nuts let into their lower ends, the screws C, working through the nuts and constructed with a head, H, having means for operating the screw, and a projection, D, beneath the head, said head resting and turning upon a plate, F, let into the floor, and the projection passing through said plate, but unsupported by it, for the purpose of preventing the legs from being laterally displaced, substantially as described.

In testimony of which invention I hereunto set my hand this 3d day of December, A. D. 1879.

ANDREW VAN BIBBER.

Witnesses:
N. K. ELLSWORTH,
E. A. ELLSWORTH.